United States Patent [19]

Kast et al.

[11] Patent Number: 5,168,704
[45] Date of Patent: Dec. 8, 1992

[54] GAS TURBINE ENGINE FUEL AND ACTUATION PRESSURE PUMPING SYSTEM

[75] Inventors: Howard B. Kast, Fairfield; James Randa, Mason, both of Ohio

[73] Assignee: General Electric Company, Cincinnati, Ohio

[21] Appl. No.: 568,804

[22] Filed: Aug. 17, 1990

[51] Int. Cl.$^5$ .............................................. F16D 31/02
[52] U.S. Cl. ........................................ 60/420; 60/428; 60/452
[58] Field of Search ................. 60/405, 420, 422, 428, 60/429, 430, 486; 91/28

[56] References Cited

U.S. PATENT DOCUMENTS

| | | | |
|---|---|---|---|
| 1,884,277 | 10/1932 | Sassen | 60/429 |
| 2,506,611 | 5/1950 | Neal et al. | |
| 2,782,595 | 2/1957 | Pauly | 60/39.28 |
| 3,011,308 | 12/1961 | Wotring | |
| 3,026,929 | 3/1962 | Burns | |
| 3,063,242 | 11/1962 | Broad | 60/39.14 |
| 3,369,491 | 2/1968 | Hoffer | |
| 3,800,534 | 4/1974 | Kacek | |
| 3,946,551 | 3/1976 | Linebrink et al. | 60/39.28 |
| 3,973,398 | 8/1976 | Kittle | 60/427 |
| 3,985,472 | 10/1976 | Virtue et al. | |
| 4,030,296 | 6/1977 | Deinlein-Kalb | 60/486 |
| 4,115,033 | 9/1978 | Kleineisel et al. | |
| 4,164,119 | 8/1979 | Parquet | 60/486 X |
| 4,205,945 | 6/1980 | Davis | |
| 4,209,984 | 7/1980 | Kittle et al. | 60/430 X |
| 4,509,325 | 4/1985 | Morgan et al. | |
| 4,607,486 | 8/1986 | Cole | 60/734 |
| 4,745,746 | 5/1988 | Geringer | |

OTHER PUBLICATIONS

Optimum Design of Water Jet Pumps, J. R. Cairns and T. Y. NA, ASME Paper No. 68-WA/FE-13 Winter Annual Meeting Dec. 1-5, 1968.

Primary Examiner—Edward K. Look
Assistant Examiner—John Ryznic
Attorney, Agent, or Firm—Jerome C. Squillaro; Bernard E. Shay

[57] ABSTRACT

In accordance with the present invention, a fuel flow circuit comprises a source of fluid, a first means for pressurizing the combustible fluid and pumping the pressurized fluid along a first path leading to a combustion apparatus for an internal combustion engine. The first means for pressurizing further pumping the combustible fluid along a second path to a first fluid-driven actuator adaptable to control some aspect of the engine. The first means for pressurizing further pumping the combustible fluid along a third path to a second means for pressurizing the combustible fluid. The second means for pressurizing pumping the combustible fluid along a fourth path, including a first diverting means, to a second fluid-driven actuator adapted to control some aspect of the engine or exhaust nozzle. The second means for pressurizing pumping combustible fluid along a fifth path, including a second diverting means, to provide an alternate source of pressurized fluid to the combustion apparatus and to the first fluid-driven actuator applicable for controlling some aspects of the engine.

12 Claims, 3 Drawing Sheets

GAS TURBINE ENGINE FUEL AND ACTUATION PRESSURE PUMPING SYSTEM

FIELD OF INVENTION

This invention relates to aircraft gas turbine engine fuel and actuation pressure supply systems with backup capability and, more particularly, to a fuel system arrangement including a centrifugal main fuel pump and a compensated variable delivery actuation fuel pump.

BACKGROUND OF THE INVENTION

It is well known in the gas turbine engine art to utilize a centrifugal fuel pump for normal operation and a separate (e.g., positive displacement) pump to supply enough fuel to start the engine. The positive displacement pump is used during startups since a properly sized centrifugal pump normally cannot supply sufficient fuel pressure while the engine is rotating at starting speeds. The separate pump is switched out after the engine reaches operating speed.

Typical prior actuation systems use a separate high pressure pump which uses oil, either the engine lubricating oil or a hydraulic fluid to control the actuators which control the configuration of the exhaust nozzle. The use of a separate fluid to control the nozzle actuators results in the necessity of including an additional, dedicated actuation pump. It would, therefore, be advantageous to provide a fuel system including both a centrifugal main pump and a separate positive displacement actuation pump, wherein, the actuation pump is a backup for the centrifugal engine fuel pump, and the centrifugal engine fuel pump is a backup for the actuation pump.

SUMMARY OF THE INVENTION

According to the present invention, there is provided an improved arrangement of fuel pumping and flow elements which provide fuel flow for combustion and for control of, for example, engine variable geometry and nozzle actuators.

In accordance with the present invention, a fuel flow circuit comprises a source of fluid, a first means for pressurizing the combustible fluid and pumping the pressurized fluid along a first path leading to a combustion apparatus for an internal combustion engine. The first means for pressurizing further pumping the combustible fluid along a second path to a first fluid-driven actuator adaptable to control some aspect of the engine. The first means for pressurizing further pumping the combustible fluid along a third path to a second means for pressurizing the combustible fluid. The second means for pressurizing pumping the combustible fluid along a fourth path, including a first diverting means, to a second fluid-driven actuator adapted to control some aspect of the engine or exhaust nozzle. The second means for pressurizing pumping combustible fluid along a fifth path, including a second diverting means, to provide an alternate source of pressurized fluid to the combustion apparatus and to the first fluid-driven actuator applicable for controlling some aspects of the engine.

In a further embodiment of the present invention, the first diverting means in the fourth path is a first check valve which controls flow from the first means for pressurizing to the second actuator. When the output pressure of the second means for pressurizing is less than the output pressure of the first means for pressurizing, the first check valve allows fuel to flow from the first means for pressurizing to the second actuator.

In a further embodiment of the present invention, the second diverting means in the fifth path is a valve which is modulated toward a closed condition to a degree which is proportional to the degree to which the second pressurization means is needed to supplement the first pressurization means. The second diverting means is closed when the second pressurization means is not needed to pressurize the combustible fluid in the first path.

In a further embodiment of the present invention, the second means for pressurizing the combustible fluid is a compensated variable delivery pump, including a compensator, adapted to set an output pressure of the variable delivery pump at a selected margin above a control level of pressure. The control level of pressure may be derived by selecting between the highest of the following: (1) a pressure at the output of the first pressuring means; (2) an operating pressure at the combustion apparatus; and (3) an operating pressure at the fluid driven actuators. The control level of pressure may also be derived from operating conditions of the engine as sensed by the engine electronic control system and, using a servovalve and pressure transducer, generating a signal pressure proportional to need.

In a further embodiment of the present invention, a jet pump, which converts a high pressure and low flow to lower pressure and higher flow, would be connected between the second means for pressurizing and the combustor. The jet pump would draw additional combustible fluid from the first path.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION

Figure 1:
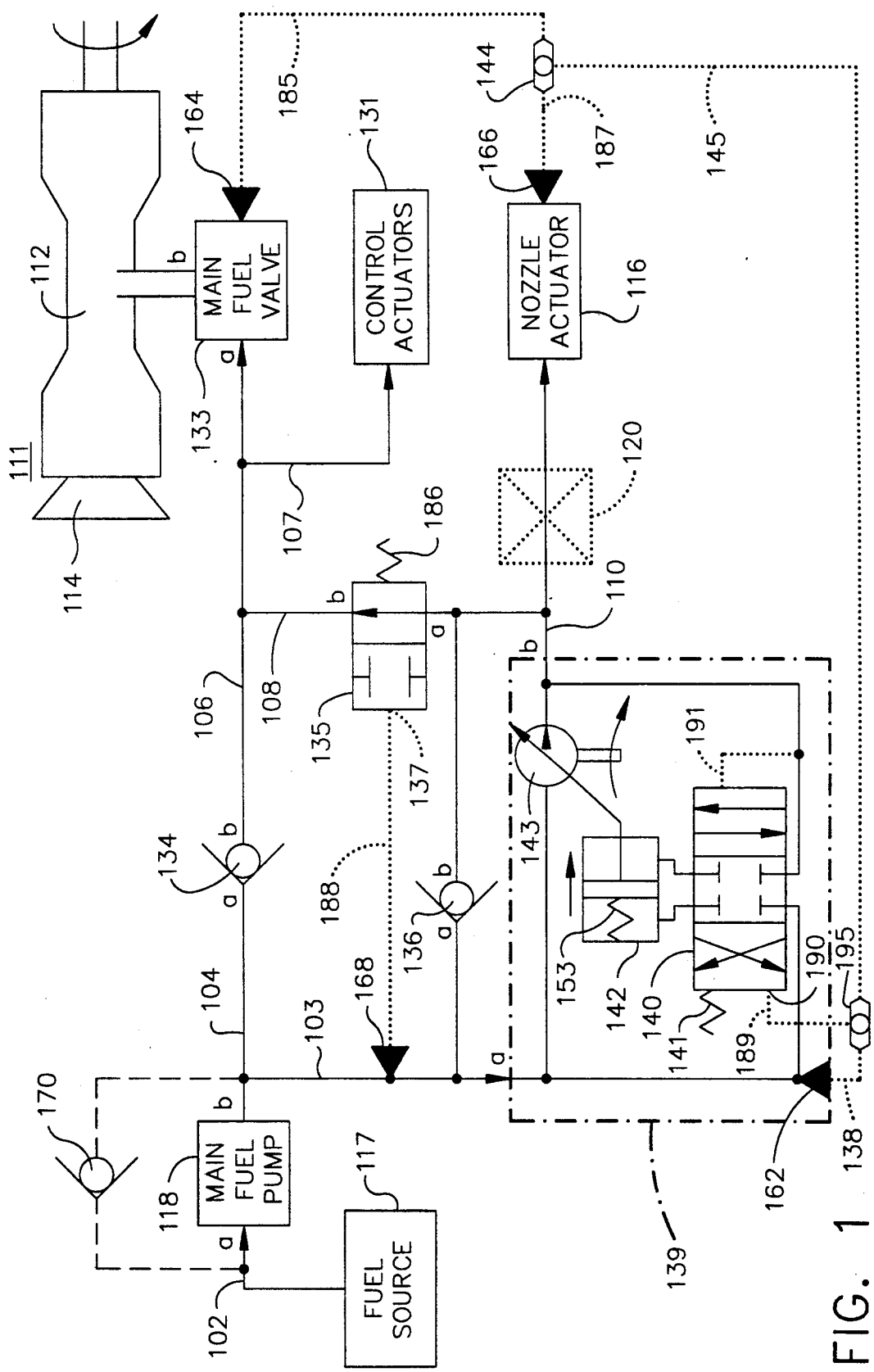
FIG. 1 is a block diagram of one embodiment of the present invention.

In FIG. 1, a fuel source 117, such as a storage or fuel tank containing a combustible fluid such as jet fuel or gasoline, is connected to a centrifugal fuel pump 118 by a fuel line 102. Centrifugal pump 118 pressurizes fuel using a shaft driven impeller rotating at high speeds to route the fuel through blades which force the fluid out of the pump. The shaft may be driven by the output of a gas turbine 111. Centrifugal fuel pumps are advantageous in that fuel may normally be pumped through them even after they fail. That is, in the failure mode they do not normally block access to the fuel source. Centrifugal pumps are also reliable, lightweight and provide a wide range of flow rates. Output of centrifugal fuel pump 118 is connected to input 134a of check valve 134 by fuel line 104. Check valve 134 may be integral with centrifugal pump 118 or a separate unit. Output 134b of check valve 134 is connected to an input 133a of main fuel valve 133 by fuel line 106. Main fuel valve 133 is adapted to control the flow of fuel into a combustion chamber 112 of a gas turbine engine 111. Fuel is channeled into combustion chamber 112 via output 133b of main fuel valve 133.

In one embodiment according to the present invention, illustrated in FIG. 1, the input 139a of a compensated variable delivery pump 139 is connected to the output 118b of centrifugal pump 118 through fuel line 103. Compensated variable delivery pump 139 may include a variable delivery pump 143 Which may be a piston or vane pump. The output 139b of variable delivery pump 139 is connected to an input 135a of start valve 135 through fuel line 110. Start valve 135 may be, for example, a part of the compensated variable delivery pump 39. Start valve 135 may be a two position spring biased shutoff valve which includes a bias spring 186. Bias spring 186 acts to open the valve when the fuel pressure at control input 137 is below a preset pressure. The preset pressure is normally proportional to the force exerted by spring 186. The pressure at control input 137 may be measured by, for example, tapping a portion of the fuel at the output 118b of centrifugal pump 118. The tapped fuel would be diverted at detector 168, which may be, for example, a hole in fuel line 103 which transmits fuel through sensor line 188 to control input 137 of start valve 135. The output 135b of start valve 135 is connected to the input 133a of main fuel valve 133. Fuel line 107 may be used to divert some of the fuel in fuel line 106 to control actuators such as, for example, the actuators which control the engine variable geometry.

Normally, as illustrated in FIG. 1, a fuel system of this type will include fuel controlled actuators such as a nozzle actuator 116. Further, to control the flow of fuel to these actuators a shutoff valve 120 may be used. The nozzle actuators 116 are normally connected to the output of compensated variable delivery pump 139 by fuel line 110. Thus, compensated variable delivery pump 139 is adapted to provide fuel to nozzle actuator 116. Check valve 136 may be provided between the input 139a and output 139b of compensated variable delivery pump 139 in order to provide fuel to nozzle actuators 116 should compensated variable delivery pump 139 fail. If compensated variable delivery pump 139 fails, then the fuel pressure at the input 136a of check valve 136 would exceed the fuel pressure at the output 136b. Thus, when pump 139 fails, fuel provided by centrifugal pump 118 will flow through check valve 136 to actuators 116.

Start valve 135 is adapted, as described previously, to pass fuel to main fuel valve 133 when the fuel pressure from centrifugal fuel pump 118 is insufficient to supply the demand. As the pressure from centrifugal fuel pump 118 increases, the flow through start valve 135 decreases until the entire requirements of main fuel valve 133 are supplied by centrifugal fuel pump 118. More particularly, as the fuel pressure at output 118b of centrifugal pump 118 increases, the pressure of the fuel tapped at detector 168 increases, increasing the pressure at control input 137. The force of the fuel pressure at control input 137 acts against spring 186, forcing start valve 135 to close as the fuel pressure at control port 137 increases.

If centrifugal fuel pump 118 fails, then fuel may be pulled from combustible fuel source 117 through centrifugal fuel pump 118 to compensated variable delivery pump 139 and, in turn through start valve 135 directly into main fuel valve 133. Thus, what would normally be a catastrophic failure of the centrifugal fuel pump may be compensated for by the arrangement according to the present invention, since compensated variable delivery pump 139 can supply at least a portion of the fuel requirements for main fuel valve 133. It will be recognized that a further check valve 170 illustrated in FIG. 1, may be included between input 118a and output 118b of centrifugal fuel pump 118. Check valve 170 would provide a path for accessing combustible fuel source 117, should centrifugal fuel pump 118 fail in a manner which blocked passage of fuel from input 118a to output 118b.

Actuators 16 such as, for example, exhaust nozzle actuators, which require high pressure fluids for control may be driven by the fuel from compensated variable delivery pump 139. Therefore, actuators 116 in FIG. 1 are connected via fuel line 110 to the output 139b of compensated variable delivery pump 139. It may also be advantageous to provide a shutoff valve 120 between high pressure actuators 116 and output 139b of variable delivery pump 139. Shutoff valve 120 could be closed during those periods when the output of compensated variable delivery pump 139 was being used to supplement or replace the output of centrifugal pump 118.

Control of compensated variable delivery fuel pump 139 may be achieved by any number of arrangements. In one, preferred embodiment of the present invention, a small amount of fuel is diverted via detector 164 in main fuel valve 133. Detector 164 may be, for example, a hole in the manifold of fuel valve 133 which transmits fuel through sensor line 185. The pressure of the tapped fuel is representative of the fuel pressure in the manifold of main fuel valve 133 and may be routed through a selector valve 144 to a second selector valve 195. Selector valves 195 and 144 may be, for example, shuttle valves manufactured by Kepner Products Company Inc. Selector valves 195 and 144 are adapted to pass the higher of two input pressures. The output signal (e.g., pressurized fuel) from selector valve 195 is transmitted via signal line 189 to control input 190 of compensated variable delivery pump 139. The pressure signal at control input 190 controls the pressure and flow out of compensated variable displacement pump 139 in a manner to be described. Selector valve 144 is also connected via sensor line 187 to detector 166 in nozzle actuator 116. Thus, the selector valve 144 is adapted to pass the greater of the pressure at detector 164 and the pressure at detector 166 to selector valve 195. Selector valve 195 is connected to detector 162 which detects the input fuel pressure at the output 118b of centrifugal fuel pump 118. Selector valve 195 is adapted to pass the higher of the two fuel pressures directly to compensated variable delivery pump 139.

It will be noted that detector devices 164, 166 and 162 may be, for example, devices adapted to divert a small portion of the fuel to the selector valves, the pressure of the diverted fuel being indicative of the pressure of the fuel at the point from which the diversion is taken. Further, these detectors 162, 164 and 166 may be, for example, pressure transducers which measure the fuel pressure and transmit an electrical signal via signal lines 138, 185 and 187 to appropriate selector valve means 144 and 195 which are adapted to pass the electrical signal indicative of the higher pressure. Once the electrical signals are transmitted to the compensated variable delivery pump 139, the electrical signal may be converted to a force or pressure signal using, for example, an electrically controlled hydraulic servovalve.

The volume and pressure of the fuel delivered by compensated variable delivery pump 139 may be controlled by these pressures signals.

The function and operation of a fuel system according to the present invention will now be described in greater detail. In FIG. 1, the present invention is applied to an internal combustion engine 111, such as a gas turbine engine, which has a combustion chamber 112. Combustion chamber 112 burns the combustible fluid which is being apportioned, manipulated and supplied thereto by the remainder of the embodiment of the invention. Fuel, for example jet fuel, is supplied to combustion chamber 112 through main fuel valve 133. While it is well known that a gas turbine engine has a compressor and a turbine, these are unimportant to the present invention, except as a means to provide power for pumps 118 and 139 and to provide thrust through nozzle 114 which may have variable elements moved by, for example, actuators 116.

Source 117 of the combustible fluid may be, for example, the jet fuel tanks of an aircraft. Fuel is supplied from source 117 to a first means for pressurizing the combustible fluid 118 which may comprise a centrifugal fuel pump. The invention further includes second means for pressurizing 139 the combustible fluid which may be, for example, a compensated variable delivery pump. When start valve 135 is open, the second means for pressurizing 139 provides pressurized fuel to main fuel valve 133.

Referring to FIG. 1, the fuel pressure at the output 118b of centrifugal fuel pump 118 is proportional to the square of the pump's shaft speed. Since centrifugal pump 118 is driven by the engine, the fuel pressure decreases substantially as the engine speed decreases, for example, during start up. Thus, during start up, when the engine is running slowly, the fuel pressure at output 118b will be very low and may not be sufficient to supply the fuel pressure necessary to start the engine. Compensated variable delivery pump 139 is therefore, designed to supplement centrifugal fuel pump 118 by providing additional fuel pressure. When engine 111 is running slowly (e.g., under starting conditions) start valve 135 is held open by spring 186 and the compensated variable delivery pump 139 is connected to main fuel valve 133 through start valve 135. Check valve 134 prevents backflow to centrifugal fuel pump 118. As the engine's shaft speed increases, the centrifugal pump discharge pressure increases and at, for example, about 250 psi (pounds per square inch) the fuel pressure detected by detector 168 and transmitted through sensor line 188 to control port 137 overcomes the spring force from spring 186 and start valve 135 closes.

Normal engine operation occurs with the centrifugal fuel pump 118 providing flow for the combustion chambers 112 and for actuators 131. Actuators 131 may be, for example, engine variable geometry actuators. During normal operation, compensated variable delivery pump 139 provides the flow and pressure necessary to control actuators 116. During normal operation, the output pressure from compensated variable delivery pump 139 is greater than the output pressure from centrifugal pump 118. Therefore, during normal operation, compensated variable delivery pump 139 is used to control actuators which require relatively high pressures, while centrifugal pump 118 is used to control actuators 131 which do not require such high pressures.

Control of compensated variable delivery pump 139 may be accomplished by tapping the fuel pressure at various key points and using that pressure to counteract spring forces and opposing fuel pressures. Selector valves may be used to select between two fuel pressures. Normally, in the present invention, the highest of the two pressures will be used as the control signal. Selector valves which transmit fuel directly are built such that the two fuel lines attached to the inputs can convey fuel having different pressures. The fuel having the higher pressure is ported to the output of the selector valve while the fuel with the lower pressure is blocked. In FIG. 1, selector valve 195 ports to compensator 140 the greater of two fuel pressures. The first pressure is the centrifugal fuel pump discharge pressure via sensor line 138 and the second pressure is from selector valve 144, via sensor line 145. Selector valve 144 ports to sensor line 145 the higher of two fuel pressures. The first pressure is the fuel manifold pressure in main control valve 133 and the second is the fuel pressure in the actuator 116. The resulting signal pressure at compensator 140 is therefore the highest of three pressures. It will be apparent that, should actuators 116 be deleted, control valve 144 could also be deleted and the output of selector valve 195 would be the greater of the manifold fuel pressure in main control valve 133 and the fuel pressure at output 118b of centrifugal pump 118.

The compensator 140 may be, for example, a servovalve which controls piston 142 which, in turn, controls variable delivery pump 143. If variable delivery pump 143 is a piston pump, piston 142 controls, for example, the wobble plate which determines the piston stroke. If variable delivery pump 143 is a vane pump, piston 142 controls the cam position. Compensator 140 will, in normal practice, be a modulating servovalve which provides continuous control of the fuel pressure to piston 142. However, for the purpose of the present description, compensator 140 may be thought of as a three position valve. In the first, or steady state position, the valve supplies substantially equal pressure to both sides of piston 142 by blocking flow into and out of the piston and the output pressure of variable delivery pump 143 is held at steady state.

Compensator 140 will be in the steady state position when the combination of the force exerted by spring 141, combined with the force due to the fuel pressure in sensor line 189 is equal to the force due to the fuel pressure in sensor line 191. If the force exerted by spring 141, in combination with the force due to the fuel pressure in sensor line 189 is greater than the force due to the fuel pressure in sensor line 191, then compensator 140 is in a second position. In the second position, compensator 140 diverts a portion of the output of variable delivery pump 143 to piston 142 in a manner which aids spring 153, forcing piston 142 to act on variable delivery pump 143 and increase the flow and pressure out of compensated variable delivery pump 139. As the pressure at the output of variable delivery pump 143 increases, the force exerted by the fuel pressure in sensor line 191 will reach a level where it exceeds the force exerted by spring 141 in combination with the force exerted by the pressure in sensor line 189. When the pressure in sensor line 191 exceeds the force exerted by spring 141 in combination with the force exerted by the fuel pressure in sensor line 189, then compensator 140 is in a third position. In the third position, compensator 140 diverts a portion of the output of variable delivery pump 143 to piston 142 in a manner which opposes the force exerted by spring 153, forcing piston 142 to act on variable delivery pump 143 and decrease the flow and pressure out of compensated variable delivery pump 139.

It will be noted that, during start up, there is little or no pressure at the output 118*b* of centrifugal pump 118, the pressure at detectors 162, 164 and 166 will be low and the pressure at central port 190 of compensator 140 will be low. Under these conditions, spring 153 will control piston 142. Thus, the fuel pressure at output 139*b* of compensated variable delivery pump 139 will rise until it reaches a predetermined value. If the pressure at output 139*b* exceeds the predetermined value, the pressure in sensor line 191 will force compensator 140 into the third position which will reduce the flow through variable delivery pump 143 until the pressure at output 139*b* reaches the predetermined value.

It will be noted that, since the pressure in sensor line 189 is a function of fuel pressure demand as measured by detectors 164 and 166, the pressure at output 139*b* of compensated variable delivery pump 139 is also a function of demand. However, due to the feedback in sensor line 191, the output pressure at 139*b* should be sufficient to meet the demand without exceeding the demand. A fuel pressure at output 139*b* which is just sufficient to actuate the loads or supply the combustion chamber, is very desirable as the heat generated in the pumping system is proportional to the fuel pressure and is therefore minimized in the present system.

Figure 3:
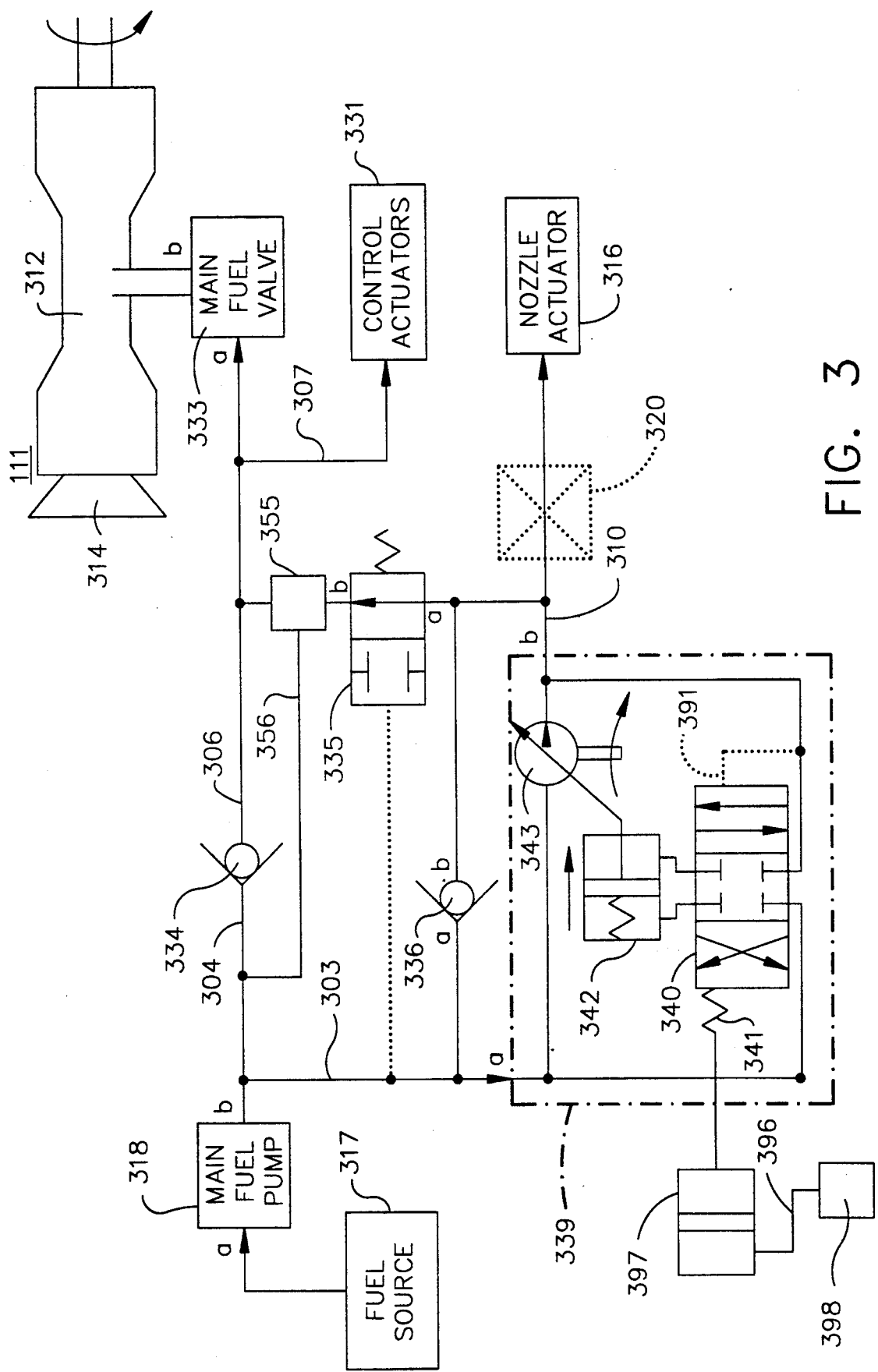
FIG. 3 is a block diagram of a further embodiment of the present invention.

It will be understood that the embodiment illustrated in FIG. 1 is not the only method of controlling the compensator and, thus, the pressure at output of the compensated variable delivery pump. One means of controlling the pressure at output 339*b* of compensated variable delivery pump 339, illustrated in FIG. 3, is to change the length of spring 341 and thus its force. If the spring is at its maximum length, a low discharge pressure in sensor line 391 will null the servovalve of the compensator 340. In FIG. 3, a control line 396 containing, for example, hydraulic fluid or fuel, could control the length of spring 341 by changing the position of piston 397. If piston 397 is moved in a manner which shortens the length of spring 341 increasing its opposing force, then the output fuel pressure at 339*b* will be increased, since the pressure in sensor line 391 required to move compensator 340 to the steady state position is increased. The pressure in control line 396 may be controlled by, for example, signals from an electronic control unit 398 which includes a hydraulic servovalve to pressurize the fluid in control line 396. Electronic control unit 398 may derive inputs from any point on the engine or by using engine models or cockpit controls in calculating adjustments to the length of spring 341.

It will also be noted that the length of spring 341 can be changed by having the variable pressure from selector valve 195 in FIG. 1 act directly on a piston such as piston 397 in FIG. 3. Thus, when the pressure at output 339*b* is low, the force on piston 397 is low so that spring 141 stays near its maximum length. When the pressure in control line 396 is high, such as during high engine thrust levels and high nozzle actuator loads, spring 341 is at its minimum length.

The pumping system according to the present invention as illustrated in FIG. 1, provides a backup for the compensated variable delivery pump 139. If compensated variable delivery pump 139 stops functioning, check Valve 136 opens, allowing pressurized fuel from centrifugal fuel pump 118 to flow to actuators 116. The fuel pressure supplied by pump 118 is sufficient for most of the operating range of the engine and nozzle. This is a key safety advantage of this system when compared to a system that uses, for example, a separate oil system for control of high pressure actuators 116. One of the other advantages of using jet fuel as a hydraulic fluid is that, if there is a hydraulic leak, it is less likely that all hydraulics will be lost since there is a large supply of fuel.

A system according to the present invention also provides some backup capability for centrifugal fuel pump 118. If centrifugal fuel pump 118 stops functioning, start valve 135 opens, allowing compensated variable delivery pump 139 to supply fuel to main fuel valve 133. The output flow of pump 139 is limited but it is sufficient to keep the engine at part power and, thus, provide power to the aircraft accessory gearbox.

Figure 2:
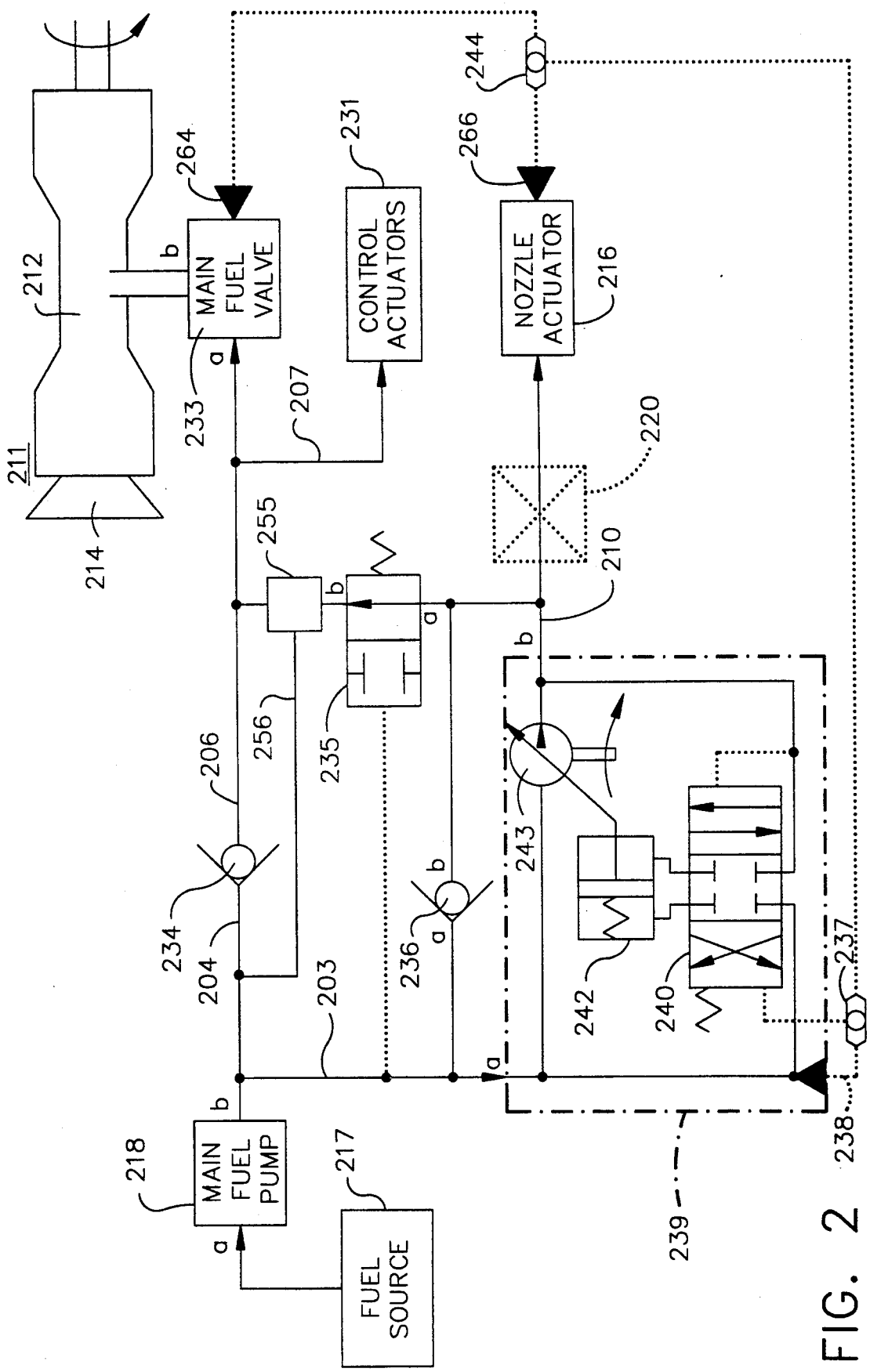
FIG. 2 is a block diagram of a second embodiment of the present invention.

FIG. 2 illustrates a further embodiment of the present invention showing a jet pump 255 between start valve 235 and main fuel valve 233. A jet pump is a means of converting high pressure/low flow to low pressure/high flow. This may be very desirable during start up when there is a large demand for fuel. As explained previously, it is desirable to keep the flow capability of the compensated variable delivery pump 139 low, just sufficient for actuation, to minimize undesirable temperature increases. The lower the fuel temperature increases, the less heat exchange capability is required. The jet pump 255 could, for example, double the flow with a variable pump discharge pressure of 650 psi and a jet pump discharge pressure of 250 psi. In a jet pump, the high pressure jet draws fuel from the centrifugal fuel pump discharge flow through the side port 256 and combines the two flows at the mixing tube.

According to further embodiments of the present invention, compensated variable delivery pump 139, 239 and 339 could be a piston, vane or multiple gear type pump.

According to a further embodiment of the present invention, the signal pressure for compensator 140, 240, 340 could be generated as a function of power lever angle, altitude and air speed, compressor discharge pressure or other variables.

According to a further embodiment of the present invention, pumps 118, 139, 218, 239, 318 and 339 could be driven by alternate means such as electric motors, air turbines, etc.

According to a further embodiment of the present invention, start valve 135, 235, 335 could be controlled as a function of engine shaft speed.

It will be apparent to those of skill in the art that elements in FIGS. 1, 2 and 3 having like second and third digits have like function and that the first digit of each number in the figures is indicative of the figure in which the element is illustrated. Thus, the descriptions of a particular element are applicable to all elements having like second and third digits. For example, the description of element 117 in FIG. 1 is equally applicable to elements 217 and 317 in FIGS. 2 and 3 respectively. Likewise, the description of element 134 in FIG. 1 is equally applicable to elements 234 and 334 in FIGS. 2 and 3 respectively.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A fuel supply system adapted to deliver fuel from a fuel source to a main fuel valve, said system comprising:
   a main fuel pump including an input thereto connected to said fuel source by a first fuel line;
   an input of a first check valve connected to an output of said main fuel pump by a second fuel line;
   said main fuel valve connected to an output of said check valve by a third fuel line;
   an output of a start valve connected to said third fuel line by a fourth fuel line;
   a variable delivery pump including an input and output wherein said output of said variable delivery pump is connected to said start valve by a fifth fuel line;
   said input of said variable delivery pump being connected to an output of said main fuel pump and an input of said check valve by a sixth fuel line; and
   a second check valve connected between said input and said output of said variable delivery pump.

2. A fuel supply system according to claim 1 wherein:
   said start valve is controllable;
   said controllable start valve control is the flow of fuel between said variable delivery pump and said main fuel valve according to the fuel pressure at the output of said main fuel pump.

3. A fuel supply system according to claim 2 further comprising:
   a load connected to said output of said variable delivery pump;
   a first measurement means adapted to measure fuel pressure at said output of said main fuel pump;
   a second measurement means adapted to measure fuel manifold pressure in said main fuel valve and generate a signal representative of said manifold pressure;
   a third measurement means adapted to measure fuel load pressure at said load and generate a signal representative of said fuel load pressure;
   a first selector valve connected to an output of said second measurement means and an output of said third measurement means and being adapted to pass the greater of said manifold pressure signal and said load pressure signal to a second selector valve which is connected to said first measurement means and passes the greater of said main fuel pump pressure, said manifold pressure and said load pressure to control the output pressure of said variable delivery pump.

4. A fuel supply system according to claim 2 wherein:
   said variable delivery pump is controlled by the greater of the output pressure of said fuel pump and the manifold pressure of said main fuel valve.

5. A fuel supply system according to claim 4 wherein: said variable displacement pump is further controlled by the pressure at a load.

6. A fuel supply system comprising:
   a fuel source containing fuel;
   a first means for pressurizing said fuel coupled to said fuel source and adapted to pump said pressurized fluid along a first, second and third path;
   a fuel valve coupled to said first path;
   a first fluid driven actuator coupled to said second path;
   a second means for pressurizing, coupled to said third path, said second means for pressurizing being adapted to pressurize said fuel along a fourth and fifth path;
   a second fluid driven actuator, coupled to said fourth path;
   a first diverting means coupling said first means for pressurizing to said fourth path, said first diverting means comprises a check valve adapted to control fuel flow from said first means for pressurizing to said second actuator; and
   a second diverting means including an input and an output, coupling said fifth path to said first and second path wherein said input of said second diverting means is coupled to said second path and said output of said second diverting means is connected to said fifth path, said second diverting means is a shutoff valve adapted to control fuel from said second means for pressurizing to said first path.

7. A fuel system according to claim 6 further comprising:
   detector means adapted to sense output pressure of said fuel from said first pressurizing means;

8. A fuel supply system according to claim 6 further comprising:
   a first detector means adapted to sense output pressure of said fuel from said first pressurizing means;
   a second detector means adapted to sense a predetermined pressure in a manifold of said fuel valve;
   a first selector means connected to said first and second detector means and adapted to select between said first and second detector means outputs; and
   said second means for pressurizing including a control input adapted to receive said selected output.

9. A fuel supply system according to claim 8 wherein:
   said second diverting means includes a control input connected to said first detector means.

10. A fuel supply system according to claim 8 wherein:
    said second means for pressurizing comprises a compensated variable delivery pump.

11. A fuel supply system according to claim 8 wherein:
    said first selector means comprises an electronic control unit hydraulically coupled to said control input of said second means for pressurizing.

12. A fuel supply system according to claim 6, further comprising:
    a jet pump between said second diverting means and said first path, said jet pump including a diverting inlet connected to said first path.

* * * * *